(12) United States Patent
Sun

(10) Patent No.: US 11,310,136 B2
(45) Date of Patent: Apr. 19, 2022

(54) METHOD, DEVICE AND MEDIUM FOR HANDING NETWORK CONNECTION ABNORMALITY OF TERMINAL

(71) Applicant: Beijing Xiaomi Mobile Software Co., Ltd., Beijing (CN)

(72) Inventor: Daliang Sun, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/923,774

(22) Filed: Jul. 8, 2020

(65) Prior Publication Data

US 2021/0250264 A1 Aug. 12, 2021

(30) Foreign Application Priority Data

Feb. 10, 2020 (CN) .......................... 202010084108.9

(51) Int. Cl.
*H04L 12/26* (2006.01)
*H04W 36/00* (2009.01)
*H04L 43/0811* (2022.01)
*H04L 43/0829* (2022.01)
*H04L 43/16* (2022.01)

(52) U.S. Cl.
CPC ...... *H04L 43/0811* (2013.01); *H04L 43/0829* (2013.01); *H04L 43/16* (2013.01); *H04W 36/0083* (2013.01)

(58) Field of Classification Search
CPC . H04L 43/0811; H04L 43/0829; H04L 43/16; H04W 36/0083
See application file for complete search history.

(56) References Cited

U.S. PATENT DOCUMENTS

| | | | | |
|---|---|---|---|---|
| 6,317,596 | B1* | 11/2001 | Elwin | H04W 24/00 455/423 |
| 2006/0233114 | A1* | 10/2006 | Alam | H04L 41/069 370/252 |
| 2006/0246888 | A1* | 11/2006 | Bender | H04W 24/08 455/423 |
| 2012/0307621 | A1 | 12/2012 | Zawaideh et al. | |

(Continued)

FOREIGN PATENT DOCUMENTS

| | | |
|---|---|---|
| CN | 108738054 A | 11/2018 |
| CN | 110324673 A | 10/2019 |

(Continued)

OTHER PUBLICATIONS

Extended European Search Report dated Feb. 1, 2021 in European Patent Application No. 20189048.0, 10 pages
(Continued)

*Primary Examiner* — Hamza N Algibhah
*Assistant Examiner* — James Ross Hollister
(74) *Attorney, Agent, or Firm* — Oblon, McClelland, Maier & Neustadt, L.L.P.

(57) ABSTRACT

The present disclosure relates to a method, a device, and a medium for handing network connection abnormality of a terminal. The method can include determining that a network link of the terminal is abnormal, determining a reason why the network link is abnormal, and performing a corresponding network link repair operation based on the reason why the network link is abnormal.

9 Claims, 5 Drawing Sheets

(56) References Cited

U.S. PATENT DOCUMENTS

| | | | |
|---|---|---|---|
| 2014/0189435 A1* | 7/2014 | Manuel-Devadoss | ............................ G06F 11/3495 714/43 |
| 2014/0317461 A1* | 10/2014 | Li | ............................ H04L 43/50 714/712 |
| 2017/0091008 A1* | 3/2017 | Cherbakov | ............ G06F 11/079 |
| 2018/0191520 A1* | 7/2018 | He | ........................ H04L 12/2898 |
| 2018/0324062 A1* | 11/2018 | Chen | ........................ H04L 67/10 |
| 2019/0320484 A1* | 10/2019 | Mou | ........................ H04L 69/40 |
| 2020/0267069 A1* | 8/2020 | Li | ........................ H04L 43/0841 |
| 2021/0022070 A1* | 1/2021 | Letor | ........................ H04W 48/14 |

FOREIGN PATENT DOCUMENTS

| | | |
|---|---|---|
| EP | 2 582 172 A1 | 4/2013 |
| WO | WO 2012/167232 A1 | 12/2012 |

OTHER PUBLICATIONS

Vivo, "Additional use cases for MCG fast recovery," 3GPP TSG-RAN WG2 Meeting #106, R2-1905826, XP051729325, May 2019, 5 pages.

\* cited by examiner

In response to determining that the packet loss probability of the network card at the terminal side is greater than or equal to a set threshold value or information about network connection abnormality is obtained from the system log of the terminal operating system or a notification displayed on the interface of the terminal and related to network connection abnormality is obtained, it is determined that the abnormality occurs when the mobile phone connects to the network

301

A connectivity inspection on the network link is performed. If the connectivity inspection fails, it is determined that the network link is abnormal

302

A mobile phone-side inspection is performed, and the result of mobile phone-side inspection is normal

303

A network-side inspection is performed, and it is determined that the network link is abnormal due to the abnormality at the network side if the result of network-side inspection is abnormal

304

The mobile phone enters the flight mode and then exits the flight mode, so as to reconnect to the operator's network

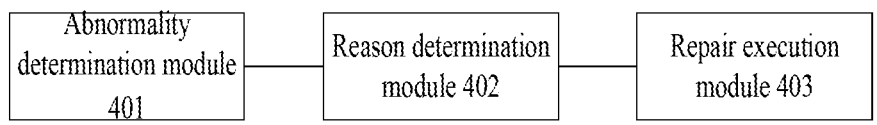

Fig. 4

METHOD, DEVICE AND MEDIUM FOR HANDING NETWORK CONNECTION ABNORMALITY OF TERMINAL

CROSS-REFERENCE TO RELATED APPLICATIONS

This application claims the priority to the Chinese Patent Application No. 202010084108.9, filed on Feb. 10, 2020, the disclosure of which is incorporated therein by reference in its entirety.

TECHNICAL FIELD

The present disclosure relates to network connection technology, and in particular, to a method, a device and a medium for handing network connection abnormality of a terminal.

BACKGROUND

With the reduction of mobile network tolling and the advent of the 5th-Generation (5G), the speed of the network has increased. The more time users spent on the mobile network, the higher quality mobile network is required. Due to various reasons, a terminal sometimes cannot access the network. In addition, the current operator's 5G network can be in the early stage of network deployment, the co-existence of the non-standalone (NSA) and standalone (SA) modes has also led to frequent and intermittent failures to access the network. The inability to access the network will affect the user experience.

SUMMARY

The present disclosure provides a method, a device, and a medium for handing network connection abnormality of a terminal.

According to a first aspect of the present disclosure, there is provided a method for handling network connection abnormality of a terminal. The method can include determining that network link of the terminal is abnormal, determining a reason why the network link is abnormal, and performing a corresponding network link repair operation based on the reason why the network link is abnormal.

Determining that network link of the terminal is abnormal can include determining that network connection of the terminal is abnormal, and a link connectivity inspection on the network link fails. Further, determining that network connection of the terminal is abnormal includes determining that the network connection of the terminal is abnormal in at least one of the followings situations: 1) it is determined that a packet loss probability of a network card at a terminal side is greater than or equal to a set threshold; 2) information about network connection abnormality is obtained from a system log of an operating system of the terminal; and 3) a notification displayed on an interface of the terminal and related to network connection abnormality is obtained.

Determining a reason why the network link is abnormal can include performing a terminal-side inspection, determining that the network link is abnormal due to abnormality at a terminal side when the terminal-side inspection indicates abnormality, and performing a network-side inspection when the terminal-side inspection indicates normality, determining that the network link is abnormal due to abnormality at a network side when the network-side inspection indicates abnormality, and performing an application server-side inspection when the network-side inspection indicates normality, and determining that the network link is abnormal due to abnormality at an application server side when the application server-side inspection indicates abnormality.

Performing a corresponding link repair operation based on the reason why the network link is abnormal may include performing a recovery operation at the terminal side when the network link is abnormal due to abnormality at the terminal side, performing at least one of the following operations when the network link is abnormal due to abnormality at the network side: re-registering a current cell by the terminal; selecting, by the terminal, a cell other than the current cell for cell registration; reconnecting to an operator's network after disconnecting a connection between the terminal and the operator's network, and sending an abnormality notification to the application server, when the network link is abnormal due to abnormality at the application server side.

According to a second aspect of the present disclosure, there is provided a device for handing network connection abnormality of a terminal. The device can include an abnormality determination module that is configured to determine that network link of the terminal is abnormal, a reason determination module that is configured to determine a reason why the network link is abnormal, and a repair execution module that is configured to perform a corresponding network link repair operation based on the reason why the network link is abnormal.

The abnormality determination module is further configured to determine that network connection of the terminal is abnormal, and the link connectivity inspection on the network link fails. Additionally, the abnormality determination module is further configured to determine that the network connection of the terminal is abnormal in at least one of the following situations: 1) it is determined that a packet loss probability of a network card at a terminal side is greater than or equal to a set threshold; 2) information about network connection abnormality is obtained from a system log of an operating system of the terminal; and 3) notification displayed on an interface of the terminal and related to the network connection abnormality is obtained.

The reason determination module is further configured to perform terminal-side inspection, determine that the network link is abnormal due to abnormality at the terminal side when the terminal-side inspection indicates abnormality, and perform a network-side inspection when the terminal-side inspection indicates normality, determine that the network link is abnormal due to abnormality at the network side when the network-side inspection indicates abnormality, and perform an application server-side inspection when the network-side inspection indicates normality, and determine that the network link is abnormal due to abnormality at the application server side when the application server-side inspection indicates abnormality.

The repair execution module can be further configured to perform a terminal-side recovery operation when the network link is abnormal due to the abnormality at the terminal side, perform at least one of the following operations, when the network link is abnormal due to abnormality at the network side: the terminal re-registers the current cell, the terminal selects a cell other than the current cell for cell registration, and the terminal reconnects to the operator's network after disconnecting connection between the terminal and the operator's network, and send an abnormality notification to the application server when the network link is abnormal due to abnormality at the application server side.

According to a third aspect of the present disclosure, there is provided a device for handing network connection abnormality of a terminal, including a processor and a memory for storing processor executable instructions. The processor can be configured to determine that the network link of the terminal is abnormal; determine a reason why the network link is abnormal, and perform a corresponding network link repair operation based on the reason why the network link is abnormal.

According to a fourth aspect of the present disclosure, there is provided a non-transitory computer-readable storage medium, which when the instructions in the storage medium are executed by the processor of the mobile terminal, enables the mobile terminal to perform a method for handing network connection abnormality of a terminal. The method can include determining that the network link of the terminal is abnormal, determining a reason why the network link is abnormal, and performing a corresponding network link repair operation based on the reason why the network link is abnormal.

The method of the present disclosure may be adopted to determine the reason why the network link is abnormal after determining that the network link of the terminal is abnormal, and perform a corresponding network link repair operation based on the reason why the network link is abnormal. Therefore, this method can be adopted to automatically identify the network link abnormality of the terminal and automatically repair the abnormality including abnormality at the terminal side, abnormality at the operator's network side, and abnormality at the application server side, thereby improving the fluency of connecting to the network via terminal by the user and improving the their online experience and reducing complaints from them.

It should be understood that the above general description and the following detailed description are only exemplary and explanatory, and do not limit the present disclosure.

BRIEF DESCRIPTION OF THE DRAWINGS

The drawings herein are incorporated into and constitute a part of this specification, show embodiments consistent with the present invention, and are used to explain the principles of the present invention together with the specification.

FIG. 3 is a flow chart showing a method for handing network connection abnormality of a terminal according to an exemplary embodiment.

FIG. 4 is a block diagram of a device for handing network connection abnormality of a terminal according to an exemplary embodiment.

DETAILED DESCRIPTION

Figure 1:
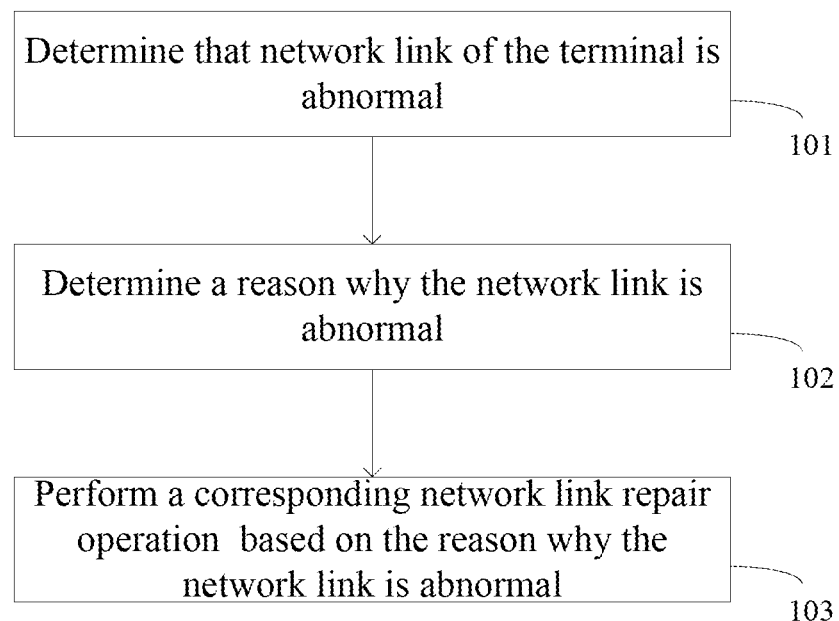
FIG. 1 is a flow chart showing a method for handing network connection abnormality of a terminal according to an exemplary embodiment.

Exemplary embodiments will be described in detail herein, examples of which are shown in the drawings. When referring to the drawings below, unless otherwise indicated, the same numerals in different drawings represent the same or similar elements. The embodiments described in the following exemplary embodiments do not represent all embodiments consistent with the present disclosure. Rather, they are merely examples of device and methods consistent with some aspects of the invention as detailed in the appended claims.

Due to various reasons, a terminal sometimes cannot access the network when surfing the network. In addition, the current operator's 5G network can in the early stage of network deployment, the co-existence of the NSA and SA modes can also lead to frequent and intermittent failures to access the network.

Currently, when a terminal, such as a mobile phone, is connected to the network, if an application cannot access the network, a message will pop up to prompt the user that "the network is unavailable currently." However, in this solution, it only prompts that the application cannot use the network currently, and does not give a specific cause of the failure and a corresponding solution.

The present disclosure provides a method for handing network connection abnormality of a terminal. In this method, after determining that the network link of the terminal is abnormal, a reason why the link is abnormal is obtained, and a corresponding network link repair operation is performed based on the reason. This method may be adopted to automatically analyze the abnormality reason and take corresponding repair operations after identifying the network link abnormality, so that users can access the network as soon as possible and the user experience is improved to a certain extent.

The terminal in the present disclosure refers to a terminal that can access the network through a mobile communication network, such as a mobile phone, a tablet computer that can connect to a mobile communication network through a subscriber identity module (SIM) card, a wearable apparatus, and the like.

FIG. 1 is a flow chart showing a method for handing network connection abnormality of a terminal according to an exemplary embodiment. As shown in FIG. 1, the method can include the following steps.

In step 101, it is determined that network link of the terminal is abnormal.

In step 102, a reason why the network link is abnormal is determined.

In step 103, a corresponding network link repair operation is performed based on the reason why the network link is abnormal.

In step 101, information about network link abnormality is obtained via an operating system of the terminal, so as to determine whether the network link is abnormal. The specific method is described by the following embodiments. In steps 102 and 103, nodes where the network link is abnormal are located, and a corresponding repair operation is performed. The nodes in the network link include a terminal side, a network side, and an application server side. The corresponding action to repair the network link can be taken only after determining the nodes where the fault occurs.

The above method may be adopted to automatically identify the network link abnormity of the terminal and automatically repair the abnormity, to repair the abnormity at the terminal side, the abnormity at the operator's network side, and the abnormity at the application server side, thereby improving the fluency of surfing the network when user uses the terminal and reducing complaints from users.

In an optional embodiment, the network link of the terminal is determined to be abnormal by determining that the network connection of the terminal is abnormal and a link connectivity inspection on the network link fails. The abnormity of the link of the terminal side, such as the mobile phone side, is felt by the user when using some applications to surf the Internet. For example, when using a chat tool, it was found that a message could not be sent. When recognizing this kind of network connection abnormality, a link connectivity inspection is also required to determine whether such network connection abnormality is due to the abnormity of the network link. For example, in a specific embodiment, the link connectivity inspection is performed through a HTTPS/PING tool. If the connectivity inspection on the network link fails, it is determined that the network connection abnormality of a terminal is due to the abnormity of the network link. If the connectivity inspection on the network link succeeds, it is determined that the network link is normal, and the network connection abnormality of the terminal may be due to the abnormality of the application itself on the terminal. At this time, for example, the abnormality can be resolved by restarting the application on the terminal.

The above method may be adopted to accurately distinguish whether the network connection abnormality of the terminal is due to the abnormity of the network link or the abnormality of the application itself, so that the reason why the network link is abnormal can be accurately determined, and relevant solutions can be accurately taken.

In an alternative embodiment, the network connection of the terminal is determined to be abnormal by determining that the network connection of the terminal is abnormal in at least one of the following situations: 1) it is determined that a packet loss probability of a network card at the terminal side is greater than or equal to a set threshold; 2) information about network connection abnormality is obtained from a system log of the terminal operating system; and 3) a notification displayed on an interface of the terminal and related to the network connection abnormality is obtained.

When the above three situations occur, it is determined that the network connection of the terminal is abnormal. The above three situations are described in detail below.

In the first situation, it is determined that the current network link is abnormal by counting an abnormal proportion of the data packet of a default network card at the current terminal side. For example, the terminal may acquire the total number of the transmitted and received data packet of the network card when it is normal and the total number of the lost data packets of the network card when it is abnormal within a period of time. Through the above information, the packet loss probability of the network card can be obtained, and the packet loss probability is compared with the set threshold to determine whether the network connection is abnormal. The set threshold here can be set according to specific applications.

In the second situation, when the terminal is used and there are abnormalities in network access of an application, the system log of the operating system (such as Android) provides the abnormal information. Through the analysis of the abnormal information, when it is determined that socket is abnormal, it is determined that the data link of the current application may be abnormal.

In the third situation, through a core message filtering function of the terminal operating system (such as Android system), it is known whether the notification displayed on the terminal interface is a message notification about network abnormity. During the process of using the application on the terminal to access the network, if the network connection is abnormal, the application will usually provide a prompt message. For example, when using a chat tool to send a chat message, the chat tool will pop up a notification such as "the network is unavailable currently" when the message cannot be sent out. When the operating system obtains the message notification about the abnormality of the network, it is determined that the front link may be abnormal.

In an alternative embodiment, the reason why the network link is abnormal is determined by performing a terminal-side inspection, determining that the network link is abnormal due to abnormity at the terminal side when the terminal-side inspection indicates abnormality, and performing a network-side inspection when the terminal-side inspection indicates normality, determining that the network link is abnormal due to abnormity at the network side when the network-side inspection indicates abnormality, and performing an application server-side inspection when the network-side inspection indicates normality, and determining that the network link is abnormal due to abnormity at the application server side when the application server-side inspection indicates abnormality.

When it is determined that the network link is abnormal, a test data packet is retransmitted to the target address, and the result of each critical path of the data service is inspected to locate the abnormal node that has a problem.

Figure 2:
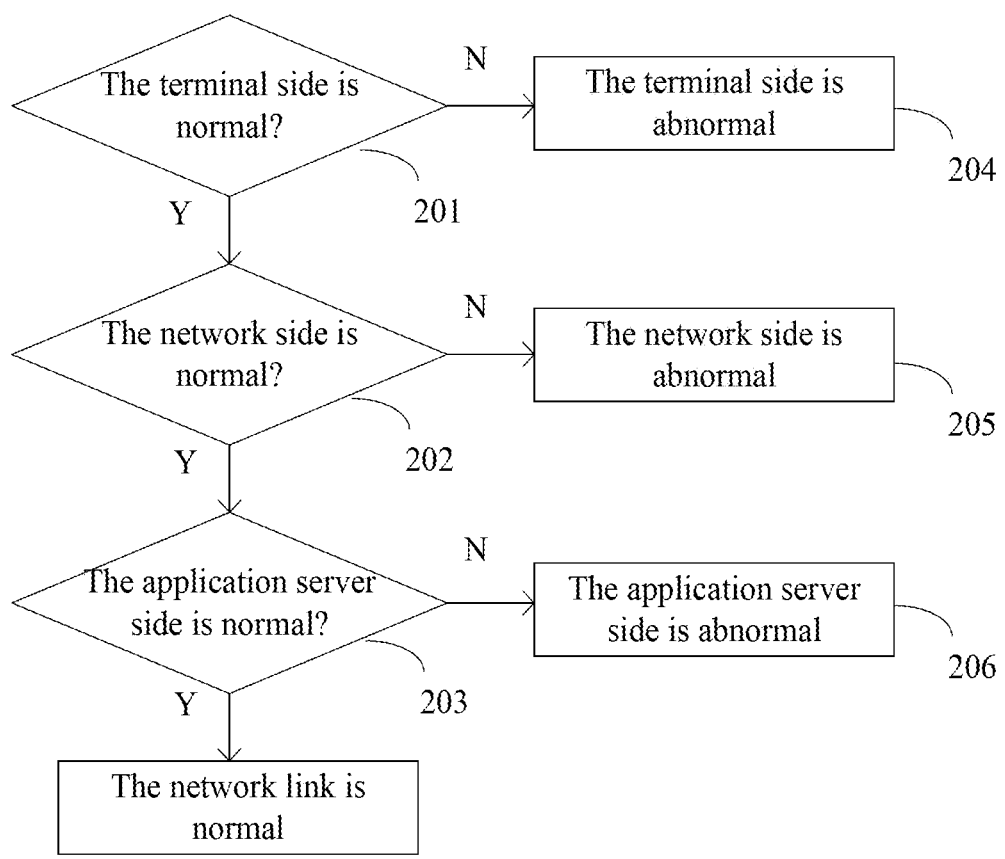
FIG. 2 is a flow chart showing a method for determining a reason why the network link is abnormal according to an exemplary embodiment.

FIG. 2 shows an exemplary flow of determining the reason why network link is abnormal in this embodiment. As shown in FIG. 2, when determining the reason why network link is abnormal, in step 201, a terminal-side inspection is performed first. When the terminal-side inspection indicates that the terminal side is abnormal, in step 204, it is determined that the network link is abnormal due to abnormity at the terminal side. When the terminal-side inspection indicates that the terminal side is normal, then the network-side inspection is performed in step 202. When the network-side inspection indicates that the network side is abnormal, it is determined in step 205 that the network link is abnormal due to abnormity at the network side. When the network-side inspection indicates that the network side is normal, then the application server-side inspection is performed in step 203. When the application server-side inspection indicates that the application server-side is abnormal, it is determined in step 206 that the network link is abnormal due to abnormity at the application server side. When the application server-side inspection indicates that the application server-side is normal, it is determined that the network link is normal.

The abnormity at the network side herein may be the abnormity of the access network or the abnormity of the core network or the abnormity of the backbone network. It should be noted that the foregoing terminal-side inspection, network-side inspection, and application server-side inspection may be performed in a manner known to those skilled in the art, and details are not described herein again. Through the above process, the node where the abnormality occurs can be accurately located, so that correct measures can be taken to solve the abnormality.

In an alternative embodiment, the corresponding link repair operation is performed based on the reason why network link is abnormal by performing a recovery operation at the terminal side when the network link is abnormal due to the abnormality at the terminal side, performing at least one of the following operations when the network link is abnormal due to the abnormality at the network side: the terminal re-registers the current cell, the terminal selects a cell other than the current cell for cell registration, the terminal reconnects to the operator's network after disconnecting connection between the terminal and the operator's network, and sending an abnormality notification to the application server, when the network link is abnormal due to the abnormality at the application server side.

The recovery operation when the terminal side is abnormal may be an inspection of factors causing the abnormality at the terminal side. For example, when it is found that the data packet is not sent normally because the Access Point Name (APN) for connecting to the network is erroneously modified by the user, the default value of APN is restored.

When the network side is abnormal, the repair operation may be performed by reconnecting to the network. The repair operation includes re-registering the current cell selecting a cell other than the current cell for registration when the current cell registration is abnormal, and re-establishing the connection with the operator's network by exiting the flight mode after entering the flight mode or turning on the machine after turning the machine off. Additionally, when the application server side is abnormal, the abnormality notification needs to be sent to the application server to remind the application server to resolve the fault.

The method of the present disclosure may be adopted to determine the reason why network link is abnormal after determining that the network link of the terminal is abnormal, and perform corresponding network link repair operation based on the reason why network link is abnormal. Therefore, this method can be adopted to automatically identify the network link abnormality of the terminal and automatically repair the abnormality including abnormality at the terminal side, abnormality at the operator's network side, and abnormality at the application server side, thereby improving the fluency of connecting to the network via terminal by the user and improving the their online experience and reducing complaints from them.

FIG. 3 shows a flow chart of a method for handling network connection abnormality of a terminal according to a specific embodiment of the present disclosure. In this embodiment, the terminal is a mobile phone and includes the following steps.

In step 301, in response to determining that the packet loss probability of the network card at the terminal side is greater than or equal to a set threshold value or information about network connection abnormality is obtained from the system log of the terminal operating system or a notification displayed on the interface of the terminal and related to network connection abnormality is obtained, it is determined that the abnormality occurs when the mobile phone connects to the network.

In step 302, a PING/HTTPS connectivity inspection on the network link is performed. If the connectivity inspection fails, it is determined that the network link is abnormal.

In step 303, a mobile phone-side inspection is performed, and the result of mobile phone-side inspection is normal.

In step 304, a network-side inspection is performed, and it is determined that the network link is abnormal due to the abnormality at the network side if the result of network-side inspection is abnormal.

In step 305, the mobile phone enters the flight mode and then exits the flight mode, so as to reconnect to the operator's network.

FIG. 4 is a block diagram of a device for handling network connection abnormality of a terminal according to an exemplary embodiment. The device includes an abnormality determination module 401, a reason determination module 402 and a repair execution module 403.

The abnormality determination module 401 is configured to determine that the network link of the terminal is abnormal. The reason determination module 402 is configured to determine a reason why network link is abnormal. The repair execution module 403 is configured to perform a corresponding network link repair operation based on the reason why network link is abnormal.

In an alternative embodiment, the abnormality determination module 401 can be further configured to determine that the network connection of a terminal is abnormal, and the link connectivity inspection on the network link fails. Further, the abnormality determination module 401 can be further configured to determine that the network connection of the terminal is abnormal in at least one of the following situations: 1) it is determined that the packet loss probability of the network card at the terminal side is greater than or equal to a set threshold; 2) information about network connection abnormality is obtained from the system log of the terminal operating system; and 3) notification displayed on the interface of the terminal and related to the network connection abnormality is obtained.

In an alternative embodiment, the reason determination module 402 is further configured to perform a terminal-side inspection, determine that the network link is abnormal due to the abnormality at the terminal side when the terminal-side inspection indicates abnormality, and perform a network-side inspection when the terminal-side inspection indicates normality, determine that the network link is abnormal due to the abnormality at the network side when the network-side inspection indicates abnormality, and perform an application server-side inspection when the network-side inspection indicates normality, and determine that the network link is abnormal due to the abnormality at the application server side when the application server-side inspection indicates abnormality.

In an alternative embodiment, the repair execution module 403 is further configured to perform a recovery operation at the terminal side when the network link is abnormal due to the abnormality at the terminal side, perform at least one of the following operations when the network link is abnormal due to the abnormality at the network side the terminal re-registers the current cell, the terminal selects a cell other than the current cell for cell registration, the terminal reconnects to the operator's network after disconnecting connection between the terminal and the operator's network, and send an abnormality notification to the application server, when the network link is abnormal due to the abnormality at the application server side.

Regarding the device in the above embodiment, the specific manner in which each module performs operations has been described in detail in the embodiment related to the method, and will not be elaborated herein.

The method of the present disclosure may be adopted to determine the reason why network link is abnormal after determining that the network link of the terminal is abnormal, and perform corresponding network link repair operation based on the reason why network link is abnormal. Therefore, this method can be adopted to automatically identify the network link abnormality of the terminal and automatically repair the abnormality including the abnormality at the terminal side, the abnormality at the operator's network side, and the abnormality at the application server side, thereby improving the fluency of connecting to the network via terminal by the user and improving the their online experience and reducing complaints from them.

Figure 5:
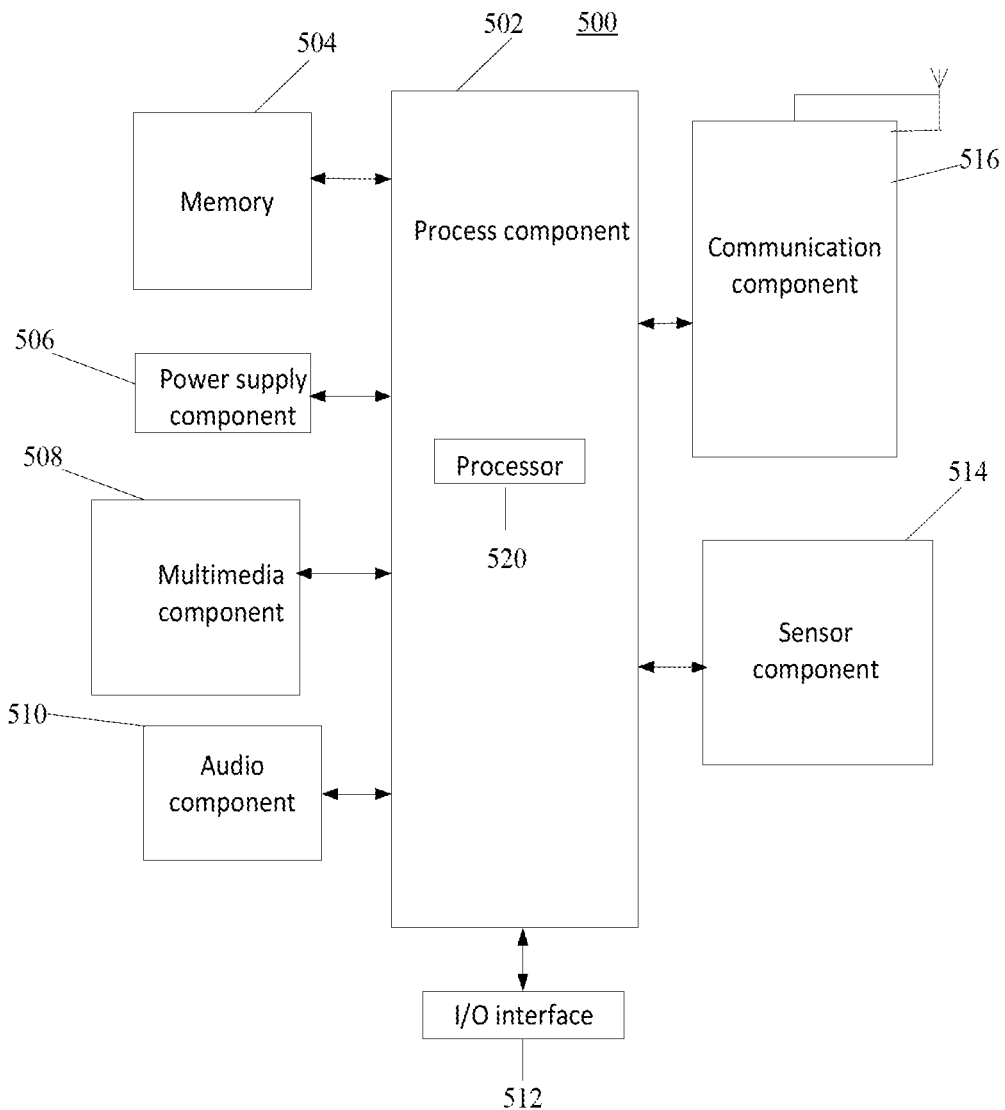
FIG. 5 is a block diagram of a device according to an exemplary embodiment (general structure of a mobile terminal).

FIG. 5 is a block diagram of a device 500 for handling network connection abnormality of a terminal according to an exemplary embodiment. For example, the device 500 may be a mobile phone, a computer, a digital broadcasting terminal, a messaging apparatus, a game console, a tablet device, a medical device, a fitness device, a personal digital assistant, and the like.

Referring to FIG. 5, the device 500 can include one or more of the following components: processing component 502, memory 504, power component 506, multimedia component 508, audio component 510, input/output (I/O) interface 512, sensor component 514, and communication component 516.

The processing component 502 generally controls the overall operations of the device 500, such as operations associated with display, phone calls, data communications, camera operations, and recording operations. The processing component 502 may include one or more processors 520 to execute instructions to complete all or part of the steps of the above method. In addition, the processing component 502 may include one or more modules to facilitate interaction between the processing component 502 and other components. For example, the processing component 502 may include a multimedia module to facilitate interaction between the multimedia component 508 and the processing component 502.

The memory 504 is configured to store various types of data to support operations at the device 500. Examples of these data include instructions for any application or method operating on the device 500, contact data, phone book data, messages, pictures, videos, and so on. The memory 504 may be implemented by any type of transitory or non-transitory storage apparatus or a combination thereof, such as static random access memory (SRAM), electrically erasable programmable read only memory (EEPROM), erasable and removable programmable read only memory (EPROM), programmable read only memory (PROM), read only memory (ROM), magnetic memory, flash memory, magnetic disk or optical disk.

The power component 506 supplies power to various components of the device 500. The power component 506 may include a power management system, one or more power sources, and other components associated with generating, managing, and distributing power for the device 500.

The multimedia component 508 includes a screen that provides an output interface between the device 500 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touch, slide, and gestures on the touch panel. The touch sensor may not only sense the boundary of the touch or sliding action, but also detect the duration and pressure related to the touch or sliding operation. In some embodiments, the multimedia component 508 includes a front camera and/or a rear camera. When the device 500 is in an operation mode, such as a shooting mode or a video mode, the front camera and/or the rear camera may receive external multimedia data. Each front camera and rear camera may be a fixed optical lens system or have focal length and optical zoom capabilities.

The audio component 510 is configured to output and/or input audio signals. For example, the audio component 510 includes a microphone (MIC). When the device 500 is in an operation mode, such as a call mode, a recording mode, and a voice recognition mode, the microphone is configured to receive an external audio signal. The received audio signal may be further stored in the memory 504 or transmitted via the communication component 516. In some embodiments, the audio component 510 further includes a speaker for outputting audio signals.

The I/O interface 512 provides an interface between the processing component 502 and a peripheral interface module. The peripheral interface module may be a keyboard, a click wheel, or a button. These buttons may include, but are not limited to a home button, a volume button, a start button, and a lock button.

The sensor assembly 514 includes one or more sensors for providing the device 500 with status assessments in various aspects. For example, the sensor component 514 can detect the on/off state of the device 500, and the relative positioning of the components. For example, the component is the display and keypad of the device 500. The sensor component 514 can also detect the position change of the device 500 or one component of the device 500, presence or absence of user contact with the device 500, the orientation or acceleration/deceleration of the device 500, and the temperature change of the device 500. The sensor component 514 may include a proximity sensor configured to detect the presence of nearby objects without any physical contact. The sensor component 514 may also include a light sensor, such as a CMOS or CCD image sensor, for use in imaging applications. In some embodiments, the sensor component 514 may further include an acceleration sensor, a gyro sensor, a magnetic sensor, a pressure sensor, or a temperature sensor.

The communication component 516 is configured to facilitate wired or wireless communication between the device 500 and other devices. The device 500 can access a wireless network based on a communication standard, such as WiFi, 2G, or 3G, or a combination thereof. In an exemplary embodiment, the communication component 516 receives a broadcast signal or broadcast related information from an external broadcast management system via a broadcast channel. In an exemplary embodiment, the communication component 516 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology, and various other technologies.

In an exemplary embodiment, the device 500 may be embodied by one or more application specific integrated circuits (ASICs), digital signal processors (DSPs), digital signal processing devices (DSPDs), programmable logic devices (PLDs), field programmable gate array (FPGA), controller, microcontroller, microprocessor, or other electronic components, and be used to implement the above method.

In an exemplary embodiment, a non-transitory computer-readable storage medium including instructions, such as a memory 504 including instructions, is also provided. The above instructions can be executed by the processor 520 of the device 500 to implement the above method. For example, the non-transitory computer-readable storage medium may be a ROM, a random access memory (RAM), a CD-ROM, a magnetic tape, a floppy disk, an optical data storage device, or the like.

A non-transitory computer-readable storage medium is provided. When instructions in the storage medium are executed by a processor of a mobile terminal, the mobile terminal is caused to perform a method for handling network connection abnormality of the terminal, the method includes: determining that the network link of the terminal is abnormal; determining the reason why network link is abnormal; and performing a corresponding network link repair operation based on the reason why network link is abnormal.

Figure 6:
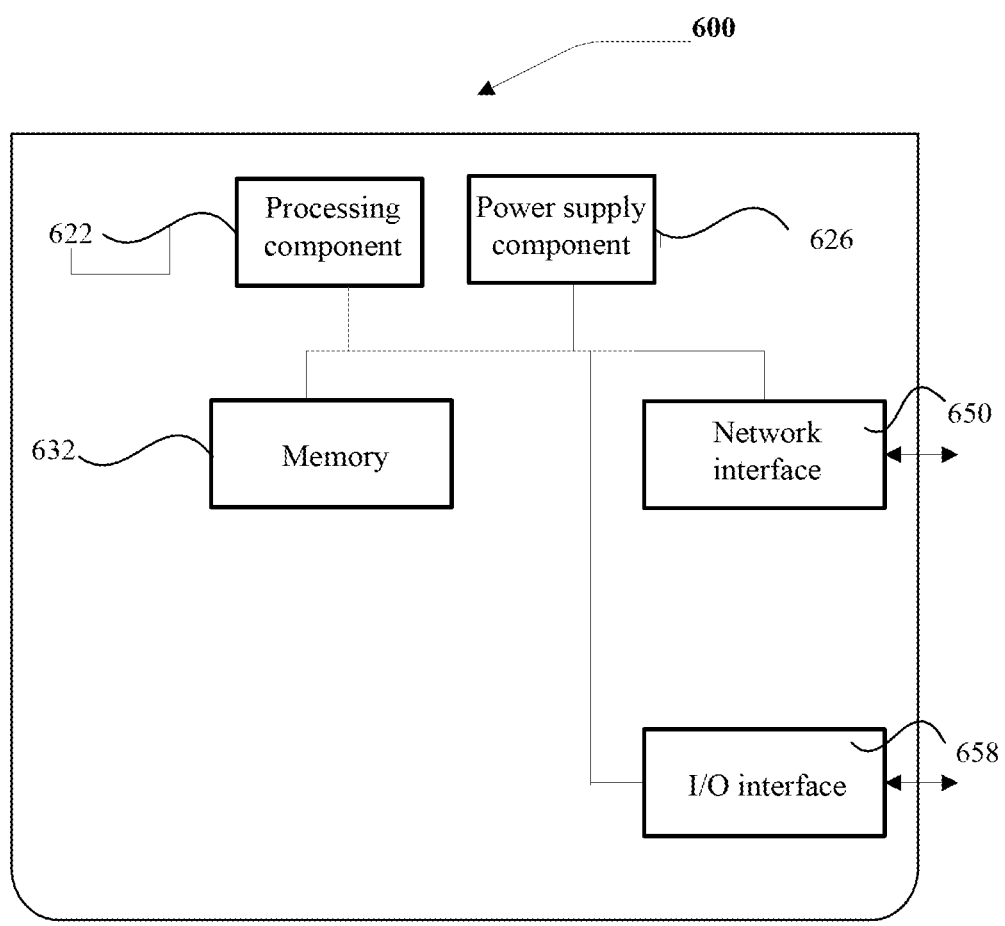
FIG. 6 is a block diagram of a device according to an exemplary embodiment (general structure of a server).

FIG. 6 is a block diagram of a device 600 for handling network connection abnormality of a terminal according to an exemplary embodiment. For example, the device 600 may be provided as a server. Referring to FIG. 6, the device 600 includes a processing component 622, which further includes one or more processors, and memory resources represented by the memory 632, for storing instructions executable by the processing component 622, such as application programs. The application programs stored in the memory 632 may include one or more modules each corresponding to a set of instructions. In addition, the processing component 622 is configured to execute instructions to perform the above method: determining that the network link of the terminal is abnormal; determining the cause of the network link abnormality; and performing a corresponding network link repair operation based on the cause of the network link abnormality.

The device 600 may further include a power supply component 626 configured to perform power management of the device 600, a wired or wireless network interface 650 configured to connect the device 600 to the network, and an input/output (I/O) interface 658. The device 600 can operate based on an operating system stored in the memory 632, such as Windows Server™, Mac OS X™, Unix™, Linux™, FreeBSD™, or the like.

After considering the description and practicing the invention disclosed herein, those skilled in the art will easily think of other embodiments of the invention. This application is intended to cover any variations, uses, or adaptive changes of the present invention that follow the general principles of the present invention and include common general knowledge or customary technical means in the technical field not disclosed in the present disclosure. The description and examples are to be considered exemplary only, and the true scope and spirit of the disclosure are defined by the following claims.

It should be understood that the present disclosure is not limited to the precise structure that has been described above and shown in the drawings, and various modifications and changes can be made without departing from the scope thereof. The scope of the disclosure is only limited by the appended claims.

What is claimed is:

1. A method for handing network connection abnormality of a terminal, comprising:
   determining that a network link of the terminal is abnormal;
   determining a reason why the ne work link is abnormal; and
   performing a corresponding network link repair operation based on the reason why the network link is abnormal,
   wherein determining the reason why the network link is abnormal comprises retransmitting a test data packet to a target address, and inspecting a result of each critical path of data service to locate an abnormal node by:
      performing a terminal-side inspection, determining, that the network link is abnormal due to abnormality at a terminal side when the terminal-side inspection indicates abnormality, and performing, a network-side inspection when the terminal-side inspection indicates normality;
      determining that the network link is abnormal due to abnormality at a network side when the network-side inspection indicates abnormality, and performing an application server-side inspection when the network-side inspection indicates normality; and
      determining that the network link is abnormal due to abnormality at an application server side when the application server-side inspection indicates abnormality.

2. The method according to claim 1, wherein determining that the network link of the terminal is abnormal further comprises:
   determining that the network connection of the terminal is abnormal; and
   determining that a link connectivity inspection on the network link fails.

3. The method according to claim 2, wherein determining that the network connection of the terminal is abnormal further comprises determining that the network connection of the terminal is abnormal in at least one of the following situations:
   it is determined that a packet loss probability of a network card at a terminal side is greater than or equal to a set threshold;
   information about network connection abnormality is obtained from a system log of an operating system of the terminal; and
   a notification displayed on an interface of the terminal and related to network connection abnormality is obtained.

4. The method according to claim 1, wherein performing a corresponding network link repair operation based on the reason why the network link is abnormal further comprises:
   performing a recovery operation at the terminal side when the network link is abnormal due to abnormality at the terminal side;
   performing at least one of the following operations when the network link is abnormal due to abnormality at the network side: re-registering a current cell by the terminal, selecting, by the terminal, a cell other than the current cell for cell registration, and reconnecting to an operator's network after disconnecting a connection between the terminal and the operator's network; and
   sending an abnormality notification to the application server when the ne work link is abnormal due to abnormality at the application server side.

5. A device for handing network connection abnormality of a terminal, the device comprising a processor and a storage device for storing computer executable instructions that, when executed by the processor, cause the processor to:
   determine that network link of the terminal is abnormal;
   determine a reason why the network link is abnormal; and
   perform a corresponding network link repair operation based on the reason why the network link is abnormal;
   wherein the processor is further configured to retransmit a test data packet to a target address, and inspect a result of each critical path of data service to locate an abnormal node by:
      performing a terminal-side inspection, determining, that the network link is abnormal due to abnormality at a terminal side when the terminal-side inspection indicates abnormality, and performing a network-side inspection when the terminal-side inspection indicates normality;
      determining that the network link is abnormal due to abnormality at a network side when the network-side inspection indicates abnormality, and performing an application server-side inspection when the network-side inspection indicates normality; and determining that the network link is abnormal due to abnormality at an application server side when the application server-side inspection indicates abnormality.

6. The device according to claim 5, wherein the processor is further configured to:
determine that the network connection of the terminal is abnormal, and
determine that a link connectivity inspection on the network link fails.

7. The device according to claim 6, wherein the processor is further configured to:
determine that the network connection of the terminal is abnormal in at least one of the following situations:
it is determined that a packet loss probability of a network card at a terminal side is greater than or equal to a set threshold;
information about network connection abnormality is obtained from a system log of an operating system of the terminal; and
a notification displayed on an interface of the terminal and related to the network connection abnormality is obtained.

8. The device according to claim 5, wherein the processor is further configured to:
perform a recovery operation at the terminal side when the network link is abnormal due to abnormality at the terminal side;
perform at least one of the following operations when the network link is abnormal to abnormality at the network side: re-register a current cell by the terminal, select, by the terminal, a cell other than the current cell for cell registration, and reconnect to an operator's network after disconnecting a connection between the terminal and the operator's network; and
send an abnormality notification to the application server when the network link is abnormal due to abnormality at the application server side.

9. A non-transitory computer-readable storage medium having instructions stored in a storage medium that are executed by a processor of a mobile terminal to cause the mobile terminal to perform a method for handing network connection abnormality of a terminal, wherein the method comprises:
determining that a network link of the terminal is abnormal;
determining a reason why the network link is abnormal; and
performing a corresponding network link repair operation based on the reason why the network link is abnormal;
wherein determining the reason why the network link is abnormal comprises, retransmitting a test data packet to a target address, and inspecting, a result of each critical path of data service to locate an abnormal node by:
performing a terminal-side inspection, determining that the network link is abnormal due to abnormality at a terminal side when the terminal-side inspection indicates abnormality, and performing a network-side inspection when the terminal-side inspection indicates normality;
determining that the network link is abnormal due to abnormality at a network side when the network-side inspection indicates abnormality, and performing an application server-side inspection when the network-side inspection indicates normality; and
determining that the network link is abnormal due to abnormality at an application server side when the application server-side inspection indicates abnormality.

\* \* \* \* \*